United States Patent
Li et al.

(10) Patent No.: US 12,470,494 B1
(45) Date of Patent: Nov. 11, 2025

(54) VEHICLE AND REMOTE COMPUTER COMMUNICATION

(71) Applicant: Ford Global Technologies, LLC, Dearborn, MI (US)

(72) Inventors: Yifei Li, Shanghai (CN); Heng Fan, Shanghai (CN); Kunpeng Gao, Songjiang (CN)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 18/758,202

(22) Filed: Jun. 28, 2024

(30) Foreign Application Priority Data

Jun. 24, 2024 (CN) .......................... 202410821902.5

(51) Int. Cl.
*H04L 47/25* (2022.01)
*H04L 47/12* (2022.01)
*H04L 47/28* (2022.01)

(52) U.S. Cl.
CPC .............. *H04L 47/25* (2013.01); *H04L 47/12* (2013.01); *H04L 47/28* (2013.01)

(58) Field of Classification Search
None
See application file for complete search history.

(56) References Cited

U.S. PATENT DOCUMENTS

| | | | |
|---|---|---|---|
| 11,564,116 B2 | 1/2023 | Guo et al. | |
| 11,695,619 B2 | 7/2023 | Povoa | |
| 2009/0254657 A1* | 10/2009 | Melnyk | H04N 21/234381 709/224 |
| 2019/0394137 A1* | 12/2019 | Zeng | H04L 47/25 |
| 2023/0254725 A1 | 8/2023 | Okuda et al. | |
| 2024/0405906 A1* | 12/2024 | Danielsson | H04L 43/0864 |

OTHER PUBLICATIONS

Prado et al., "Enhanced privacy and reliability for secure geocasting in VANET", Nov. 29, 2013, IEEE, 2013 IEEE International Conference on Communications (ICC) (2013, pp. 1599-1603) (Year: 2013).*
Dos Santos Roque, A., "Navigating the Future: Connected Cars and V2X Communication," www.linkedin.com, Jan. 23, 2024, 9 pages.

* cited by examiner

*Primary Examiner* — Davoud A Zand
(74) *Attorney, Agent, or Firm* — Christopher Storms; Brooks Kushman P.C.

(57) ABSTRACT

Upon transmitting respective messages to a remote computer communicatively coupled to a computer via a network, respective first timestamps are generated. Upon receiving, from the remote computer, respective second timestamps at which the remote computer received the respective messages via the network, a best fit line is determined based on respective first timesteps between the respective first timestamps and respective second timesteps between the respective second timestamps. A transmission time is determined based on the best fit line and a future second timestep. A data message is transmitted to the remote computer via the network at the transmission time.

20 Claims, 5 Drawing Sheets

VEHICLE AND REMOTE COMPUTER COMMUNICATION

CROSS REFERENCE TO RELATED APPLICATION

This patent application claims priority to Chinese Patent Application No. 202410821902.5, filed Jun. 24, 2024, which is hereby incorporated herein by reference in its entirety.

BACKGROUND

An object, such as a vehicle, a robot, a drone, etc., can be equipped with electronic and electro-mechanical components, e.g., computing devices, networks, sensors, controllers, etc. Sensors can provide data about target objects in an environment around the object. Additionally, remote computers can communicate with the object, e.g., via a packet network, to provide the object with such data. A computing device can operate the object and make real-time decisions based on data received from sensors and/or the remote computers.

DETAILED DESCRIPTION

Figure 1:
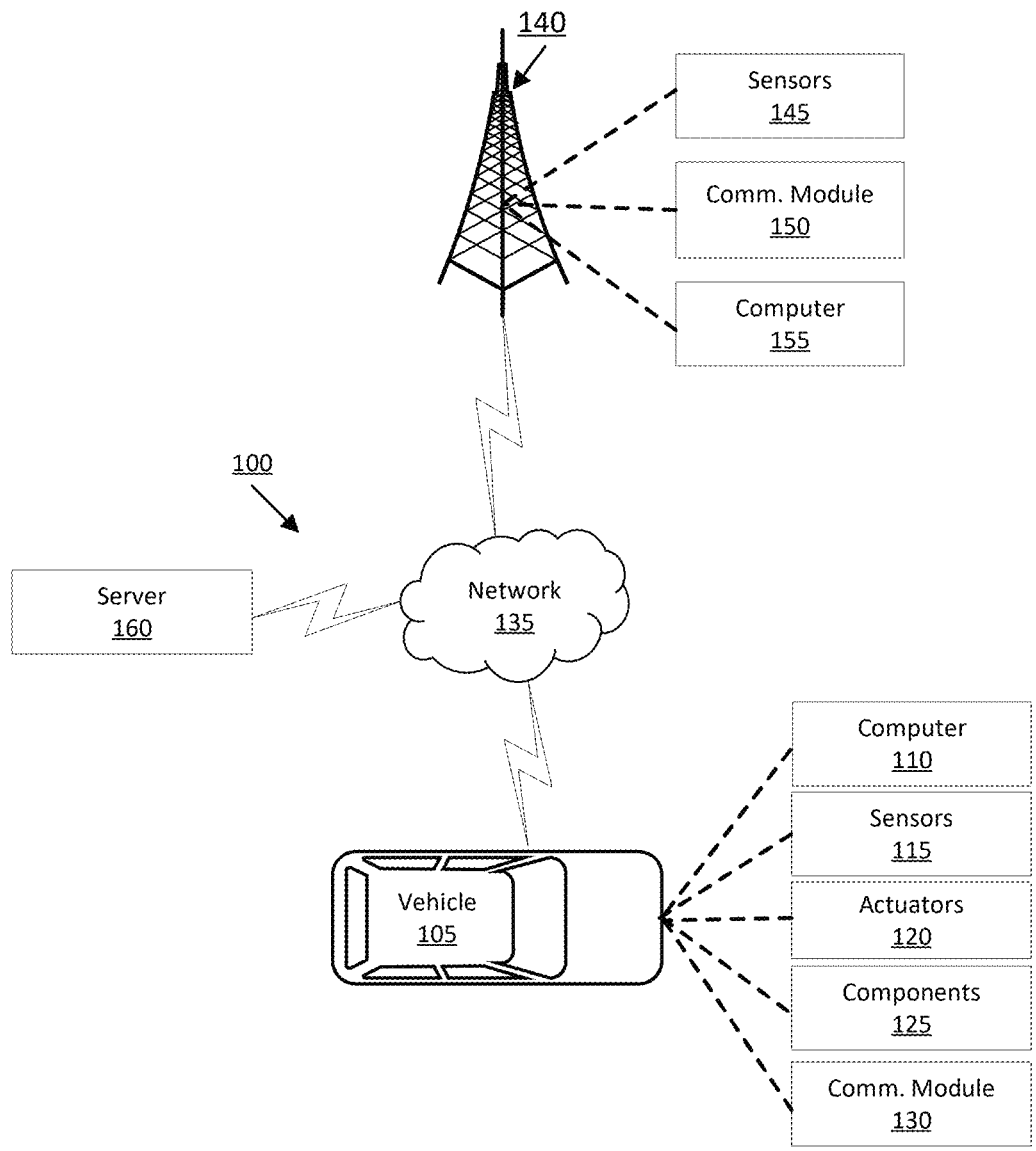
FIG. 1 is a block diagram illustrating an example vehicle control system.

A computer in a system including vehicles, robots, drones, etc., can be programmed to operate the system or components thereof based on acquiring and processing sensor data regarding an environment around the system. As one example, the computer can plan a path upon which to operate a vehicle that accounts for a plurality of objects in the environment and operates the vehicle along the path. As another example, the computer can plan a path upon which to guide a robot arm that accounts for other robot arms in the environment and operates the robot arm along the path to move an end effector for example a gripper, to pick up one part from a plurality of parts and orient the one part for assembly. Vehicle operation will be described herein as a non-limiting example of a computer that operates a system or components thereof in an environment.

Vehicles can employ vehicle-to-vehicle (V2V) and vehicle-to-infrastructure (V2I) communications, collectively known as V2X, for communication purposes. For example, V2X communications include one or more communication networks in which vehicles and infrastructure elements are the communicating nodes that provide one another with information, such as vehicle operation data. V2X communications allow vehicles to communicate with other vehicles, infrastructure, and/or other remote devices, using wireless communications technologies, such as a packet network.

A vehicle computer can, for example, determine to operate a vehicle based on receiving messages from remote computers via the packet network. The packet network transfers the messages between the vehicle computer and remote computers according to a data transfer rate (i.e., an amount of data that is moved between communication nodes within a given time). However, communication latency (i.e., an amount of time for data to transfer between communication nodes) of the packet network can be temporarily increased by various factors (e.g., based on a distance between a vehicle and other communication nodes, network congestion, bandwidth, etc.), which can delay receipt of messages transferred on the packet network. That is, messages can remain on the packet network for extended periods of time, which increases congestion on the packet network and decreases throughput of the packet network thereby decreasing efficiency of the packet network.

As discussed herein, a remote computer can determine a transmission time at which to transmit a data message via a network based on a best fit line determined based on respective first timesteps and respective second timesteps. The remote computer can then transmit the data message to a vehicle computer at the transmission time. Using the best fit line to estimate the transmission time at which to transmit the data message delays transmission of the data message to correspond with an expected communication latency of the network. Determining the transmission time based on the best fit line can reduce a likelihood of temporary increases in communication latency of the network, which can increase the efficiency of the network by reducing network congestion and maximizing throughput on the network.

A system includes a computer including a processor and a memory, the memory storing instructions executable by the processor to, upon transmitting respective messages to a second computer communicatively coupled to the first computer via a network, generate respective first timestamps. The instructions further include instructions to, upon receiving, from the second computer, respective second timestamps at which the second computer received the respective messages via the network, determine a best fit line based on respective first timesteps between the respective first timestamps and respective second timesteps between the respective second timestamps. The instructions further include instructions to determine a transmission time based on the best fit line and a future second timestep. The instructions further include instructions to transmit a data message to the second computer via the network at the transmission time.

The instructions can further include instructions to estimate the future second timestep based on an amount of data included in the data message and an expected data transfer rate of the network.

The best fit line can represent a set of points determined by dividing the respective first timesteps by the respective second timesteps.

The instructions can further include instructions to determine a future first timestep based on the best fit line and the future second timestep. The instructions can further include instructions to determine the transmission time based on the future first timestep and a previous transmission time. A previous data message can be provided to the second computer at the previous transmission time.

The first computer can be included in an infrastructure element, and the second computer can be included in an object remote from the infrastructure element.

The first computer can be a server, and the second computer can be included in an object.

The system can further include second computer, including a second processor and a second memory storing instructions executable by the second processor such that the second computer can be programmed to operate an object based on the data message.

The system can further include the second computer, including a second processor and a second memory storing instructions executable by the second processor such that the second computer can be programmed to, upon receiving the respective messages, generate the respective second timestamps. The second computer can be further programmed to transmit, via the network, the respective second timestamps to the first computer.

A method includes, upon transmitting, via a network, respective messages to a second computer, generating, via a first computer, respective first timestamps. The method further includes, upon receiving, from the second computer, respective second timestamps at which the second computer received the respective messages, determining, via the first computer, a best fit line based on respective first timesteps between the respective first timestamps and respective second timesteps between the respective second timestamps. The method further includes determining a transmission time based on the best fit line and a future second timestep. The method further includes transmitting a data message to the second computer at the transmission time.

The method can further include, via the first computer, the future second difference based on an amount of data included in the data message and an expected data transfer rate of a network.

The best fit line can represent a set of points determined by dividing the respective first timesteps by the respective second timesteps.

The method can further include determining, via the first computer, a future first timestep based on the best fit line and the future second timestep. The method can further include determining, via the first computer, the transmission time based on the future first timestep and a previous transmission time. A previous data message can be provided to the second computer at the previous transmission time.

The first computer can be included in an infrastructure element, and the second computer can be included in an object remote from the infrastructure element.

The first computer can be a server, and the second computer can be included in an object.

The method can further include operating, via the second computer, an object based on the data message.

The method can further include, upon receiving the respective messages, generating, via the second computer, the respective second timestamps. The method can further include transmitting, via the network, the respective second timestamps to the first computer.

Further disclosed herein is a computing device programmed to execute any of the above method steps. Yet further disclosed herein is a computer program product, including a computer readable medium storing instructions executable by a computer processor, to execute an of the above method steps.

Figure 2:
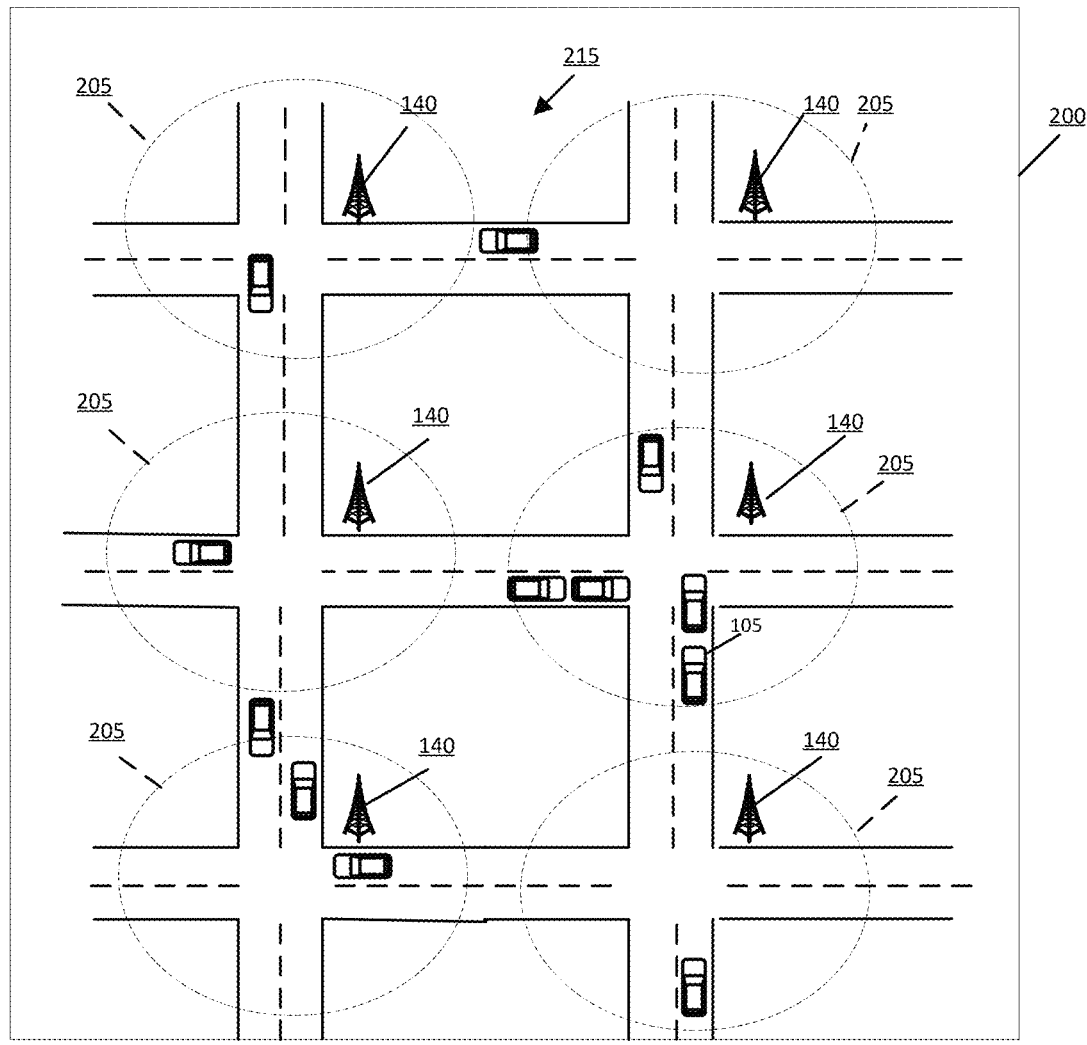
FIG. 2 is a diagram illustrating example areas within an example region in which the system of FIG. 1 would be implemented.
Figure 3:
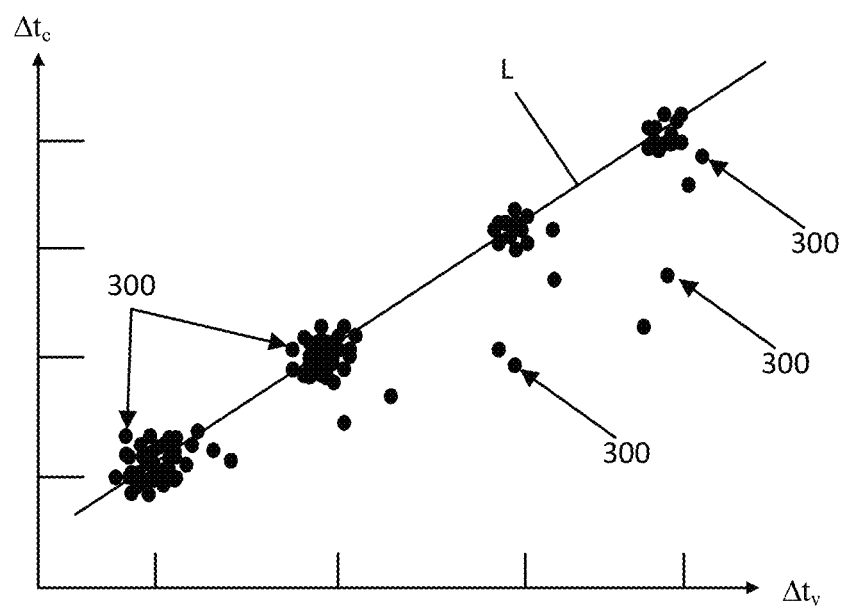
FIG. 3 is a plot illustrating an exemplary best fit line based on first timesteps and second timesteps.

With reference to FIGS. 1-3, an example vehicle control system 100 includes a vehicle 105 including a vehicle computer 110 and a remote computer 155, 160. The remote computer 155, 160 is programmed to, upon transmitting respective messages to the vehicle computer 110 communicatively coupled to the remote computer 155, 160 via a network 135, generate respective first timestamps $t_c$. The remote computer 155, 160 is further programmed to, upon receiving, from the vehicle computer 110, respective second timestamps $t_v$ at which the vehicle computer 110 received the respective messages via the network 135, determine a best fit line L based on respective first timesteps $\Delta t_c$ between the respective first timestamps $t_c$ and respective second timesteps $\Delta t_v$ between the respective second timestamps $t_v$. The remote computer 155, 160 is further programmed to determine a transmission time based on the best fit line L and a future second timestep $\Delta t_{vf}$. The remote computer 155, 160 is further programmed to transmit a data message to the vehicle computer 110 via the network 135 at the transmission time.

The vehicle 105 includes a vehicle computer 110, sensors 115, actuators 120 to actuate various vehicle components 125, and a vehicle communications module 130. The vehicle computer 110 in the vehicle 105 receives data from the sensors 115. The communications module 130 allows the vehicle computer 110 to communicate with a remote server computer 160, an infrastructure element 140, and/or other vehicles (e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135).

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation (e.g., an ASIC for processing sensor data and/or communicating the sensor data). In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in the vehicle computer 110.

The vehicle computer 110 may include programming to operate one or more of vehicle 105 propulsion, steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to (e.g., via a vehicle communications network such as a communications bus as described further below) more than one processor (e.g., included in electronic controller units (ECUs) or the like included in the vehicle 105) for monitoring and/or controlling various vehicle components 125 (e.g., a transmission controller, a steering controller, etc.). The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices (e.g., sensors 115, an actuator 120, ECUs, etc.). Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115 (e.g. front view, side view, etc.) providing images from an area surrounding the vehicle 105. In the context of this disclosure, an object is a physical (i.e., material) item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 160, etc. The data may, for example, include a location of the vehicle 105. Location data specifies a point or points on a ground surface and may be in a known form (e.g., geo-coordinates such as latitude and longitude coordinates obtained via a navigation system, as is known, that uses the Global Positioning System (GPS)). Additionally, or alternatively, the data can include a location of an object (e.g., a vehicle, a sign, a tree, etc.) relative to the vehicle 105. As one example, the data may be image data of the environment around the vehicle 105. In such an example, the image data may include one or more objects and/or markings (e.g., lane markings) on or along a road. Image data herein means digital image data (e.g., comprising pixels with intensity and color values) that can be acquired by camera sensors 115. The sensors 115 can be mounted to any suitable location in or on the vehicle 105 (e.g., on a vehicle 105 bumper, on a top of a vehicle 105, etc.) to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including propulsion and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a park assist component, an adaptive cruise control component, an adaptive steering component, etc.

In addition, the vehicle computer 110 may be configured for communicating via a vehicle-to-vehicle communication module 130 or interface with devices outside of the vehicle 105 (e.g., through a vehicle-to-vehicle (V2V) or vehicle-to-infrastructure (V2X) wireless communications (cellular and/or short-range radio communications, etc.) to another vehicle, and/or to a remote server computer 160 (typically via direct radio frequency communications)). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. The label "V2X" is used herein for communications that may be vehicle-to-vehicle (V2V) and/or vehicle-to-infrastructure (V2I), and that may be provided by communication module 130 according to any suitable short-range communications mechanism (e.g., DSRC, cellular, or the like).

The network 135 represents one or more mechanisms by which a vehicle computer 110 may communicate with remote computing devices (e.g., the remote server computer 160, another vehicle computer, the infrastructure element 140, etc.). Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The infrastructure element 140 includes a physical structure such as a tower or other support structure (e.g., a pole, a box mountable to a bridge support, cell phone tower, road sign support, etc.) on or in which infrastructure sensors 145, as well as an infrastructure communications module 150 and computer 155 can be housed, mounted, stored, and/or contained, and powered, etc. One infrastructure element 140 is shown in FIG. 1 for ease of illustration, but the system 100 could and likely would include tens, hundreds, or thousands of infrastructure elements 140.

An infrastructure element 140 is typically stationary, i.e., fixed to and not able to move from a specific physical location. The infrastructure sensors 145 may include one or more sensors such as described above for the vehicle 105 sensors 115, e.g., LIDAR, radar, cameras, ultrasonic sensors, etc. The infrastructure sensors 145 are fixed or stationary. That is, each infrastructure sensor 145 is mounted to the infrastructure element 140 so as to have a substantially unmoving and unchanging field of view.

Infrastructure sensors 145 thus provide field of views in contrast to vehicle 105 sensors 115 in a number of advantageous respects. First, because infrastructure sensors 145 have a substantially constant field of view, determinations of vehicle 105 and object locations can be accomplished with fewer and simpler processing resources than if movement of the infrastructure sensors 145 also had to be accounted for. Further, the infrastructure sensors 145 include an external perspective of the vehicle 105 and can sometimes detect features and characteristics of objects not in the vehicle 105 sensors 115 field(s) of view and/or can provide more accurate detection, e.g., with respect to vehicle 105 location and/or movement with respect to other objects. Yet further, infrastructure sensors 145 can communicate with the infrastructure element 140 computer 155 via a wired connection, whereas vehicles 105 typically can communicates with infrastructure elements 140 only wirelessly, or only at very limited times when a wired connection is available. Wired communications are more reliable and can be faster than wireless communications such as vehicle-to-infrastructure communications or the like.

The communications module 150 and computer 155 typically have features in common with the vehicle computer 110 and vehicle communications module 130, and therefore will not be described further to prevent redundancy. Although not shown for ease of illustration, the infrastructure element 140 also includes a power source such as a battery, solar power cells, and/or a connection to a power grid.

The remote server computer 160 can be a conventional computing device, i.e., including one or more processors and one or more memories, programmed to provide operations such as disclosed herein. Further, the remote server computer 160 can be accessed via the network 135, e.g., the Internet, a cellular network, and/or or some other wide area network.

FIG. 2 is a diagram illustrating an example region 200. A region 200 is three-dimensional space, including an area of a ground surface, defined for an infrastructure 215. The infrastructure 215 includes a plurality of infrastructure elements 140 in communication with each other, e.g., via the network 135. The plurality of infrastructure elements 140 are provided to monitor the region 200 around the infrastructure elements 140, as shown in FIG. 2. The region 200 may be, e.g., a neighborhood, a district, a city, a county, etc., or some portion thereof. The region 200 could alternatively be defined by an area on a ground surface that is defined by a radius encircling the plurality of infrastructure elements 140 or some other distance or set of distances relative to the plurality of infrastructure elements 140.

In addition to vehicles 105, a region 200 can include other objects, e.g., bicycles, poles, bumps, potholes, curbs, berms, fallen trees, litter, construction barriers or cones, etc. Objects can be specified as being located according to a coordinate system for an area maintained by the vehicle computer 110 and/or infrastructure computer 155, e.g., according to a Cartesian coordinate system or the like specifying coordinates in the region 200. Additionally, data about an object could specify characteristics of an object in a sub-region such as on or near a road, e.g., a height, a width, etc.

The region 200 includes one or more sub-regions 205, as shown in FIG. 2. Each infrastructure element 140 in the region 200 is provided to monitor one respective sub-region 205. Each sub-region 205 is a three-dimensional space, including an area of a ground surface, that is of interest or focus for a particular traffic analysis, e.g., an intersection, a school zone, a railroad crossing, a construction zone, a crosswalk, etc., in the region 200. An sub-region 205 is proximate to a respective infrastructure element 140. In the present context, "proximate" means that the sub-region 205 is defined by a field of view of the infrastructure element 140 sensor 145. The sub-region 205 could alternatively be an area defined by a radius around the respective infrastructure element 140 or some other distance or set of distances relative to the respective infrastructure element 140.

Turning now to FIG. 3, the infrastructure computer 155 or the remote server computer 160 is programmed to determine a best fit line L based on a set of points 300. The set of points 300 is determined based on respective first timesteps $\Delta t_c$ and respective second timesteps $\Delta t_v$. The best fit line L is a line through the set of points 300 that minimizes respective distances between the respective points and the line.

To determine the set of points 300, the remote computer 155, 160 transmits respective messages to one or more vehicle computers 110 via the network 135. Upon transmitting the respective messages, the remote computer 155, 160 can generate respective first timestamps $t_c$. That is, upon providing the respective messages, the remote computer 155, 160 can store (e.g., in a memory thereof) respective current times at which the respective messages are provided to the vehicle computer(s) 110. The messages may include a request to transmit respective second timestamps $t_v$ (i.e., a time at which the respective messages are received at the vehicle computer(s) 110).

The remote computer 155, 160 is programmed to determine respective first timesteps $\Delta t_c$ based on the respective first timestamps $t_c$. The respective first timesteps $\Delta t_c$ are respective differences between sequential first timestamps $t_c$. For example, one respective first timestep $\Delta t_c$ is a difference in time between a previous first timestamp $t_{c-1}$ and a current first timestamp $t_c$.

Upon receiving respective second timestamps $t_v$ via the network 135, the remote computer 155, 160 can determine respective second timesteps $\Delta t_v$ based on the respective second timestamps $t_v$. The respective second timesteps $\Delta t_v$ are respective differences between sequential second timestamps $t_v$. For example, one respective second timestep $\Delta t_v$ is a difference in time between a previous second timestamp $t_{v-1}$ and a current second timestamp $t_v$. The remote computer 155, 160 can determine the set of points 300 by dividing the respective first timesteps $\Delta t_c$ by the respective second timesteps $\Delta t_v$.

The remote computer 155, 160 can determine the best fit line L based on the set of points 300 using known calculation methods (e.g., linear least squares, linear regression, random sample consensus (RANSAC), etc.). For example, the best fit line L can be determined using linear regression. In such an example, the best fit line L can be determined according to:

$$Y = \beta_0 + \beta_1 X \qquad (1)$$

where Y is the first timestep $\Delta t_c$, X is the second timestep $\Delta t_v$, $\beta_0$, and $\beta_1$ are regression constants. The regression constants $\beta_0$, $\beta_1$ are determined (e.g., using the least squares method) to minimize the residual sum of square:

$$\sum_{i=1}^{n} e_i^2 \qquad (2)$$

where n is a total number of first timesteps $\Delta t_c$ and e is a residual (i.e., a difference between a predicted result and an actual result). The total number n of first timesteps $\Delta t_c$ is a same number as a total number of second timesteps $\Delta t_v$. The residual e is defined according to:

$$e_i = Y_i - (\beta_1 X_i + \beta_0) \quad (3)$$

According to Equations 1-3, the solutions of the coefficients $\beta_0$, $\beta_1$ that minimize an error of Equation 1 are given by:

$$\beta_1 = \frac{\sum_{i=1}^{n}(X_i - \overline{X})(Y_i - \overline{Y})}{\sum_{i=1}^{n}(X_i - \overline{X})^2} \quad (4)$$

$$\beta_0 = \overline{Y} - \beta_1 \overline{X} \quad (5)$$

where $\overline{X}$ is a mean of the second timesteps $\Delta t_v$, and $\overline{Y}$ is a mean of the first timesteps $\Delta t_c$.

The remote computer 155, 160 is programmed to determine a transmission time based on the best fit line L. The transmission time is a future time at which to provide a data message (as discussed further below) to the vehicle computer 110. The remote computer 155, 160 delays transmission of the data message until the transmission time so as to increase a likelihood of achieving the expected communication latency of the network 135. Since various factors can affect the communication latency of the network 135, the expected communication latency may be an average or other statistical measure of real-time communication latencies for the network 135. Upon determining the transmission time, the remote computer 155, 160 can transmit the data message to the vehicle computer 110 via the network 135 at the transmission time.

To determine the transmission time, the remote computer 155, 160 can estimate a future second timestep $\Delta t_{vf}$ based on an amount of data (e.g., measured in bits) included in the data message and an expected data transfer rate. The future second timestep $\Delta t_{vf}$ can be estimated by Equation 6:

$$\Delta t_{vf} = \frac{A}{DR} \quad (6)$$

where A is the amount of data included in the data message, and DR is the expected data rate.

As used herein, a "data transfer rate" is an amount of data (e.g., measured in bytes) that is transferred across a network 135 in a given amount of time. That is, the data transfer rate is a speed at which data is transferred between communication nodes via the network 135. Typically, various factors (e.g., traffic prioritization, encryption, congestion, transmission medium, etc.) can affect the data transfer rate of a network 135 in real-time. The expected data transfer rate may be an average or other statistical measure of real-time data transfer rates for the network 135. The expected data transfer rate may be stored (e.g., in a memory of the remote computer 155, 160).

Upon determining the future second timestep $\Delta t_{vf}$, the remote computer 155, 160 can determine a future first timestep $\Delta t_{cf}$ based on the best fit line L. That is, the remote computer 155, 160 can calculate the future first timestep $\Delta t_{cf}$ by solving Equation 1 using the future second timestep $\Delta t_{vf}$ and the coefficients $\beta_0$, $\beta_1$ determined by Equations 4 and 5.

The remote computer 155, 160 can then predict the transmission time based on the future first timestep $\Delta t_{cf}$ and a previous data message. That is, the future first timestep $\Delta t_{cf}$ indicates an amount of time between a previous transmission time (i.e., a time when the previous data message was sent) and the transmission time (i.e., a time when the data message should be sent). Said differently, the future first timestep $\Delta t_{cf}$ starts at the previous transmission time and ends at the transmission time. The remote computer 155, 160 can store (e.g., in a memory thereof) respective current times at which data messages are provided to the vehicle computer(s) 110. By providing the data message at the transmission time, the remote computer 155, 160 can increase a likelihood that the data message will be received by the vehicle computer 110 based on the expected communication latency of the network 135, which can increase the likelihood of the network 135 achieving the expected data transfer rate thereby increasing the efficiency of the network 135.

The data message may specify operation data for the sub-region 205. The remote computer 155, 160 can determine the operation data for the sub-region 205. In this context, "operation data" are data describing movement and positions of vehicles relative to each other, i.e., operation data include data measuring various vehicle attributes as the vehicle operates in the area. The operation data can include, e.g., vehicle speed data, vehicle turning data, etc. That is, as vehicles operate in the sub-region 205, the operation data provide measurements describing how the vehicles operate in the sub-region 205.

The remote computer 155, 160 can determine the operation data based on infrastructure sensor 145 data. For example, the infrastructure sensor 145 can capture data, e.g., image and/or video data, of the sub-region 205 and transmit the data to the infrastructure computer 155. Video data can be in digital format and encoded according to conventional compression and/or encoding techniques, providing a sequence of frames of image data where each frame can have a different index and/or represent a specified period of time, e.g., 10 frames per second, and arranged in a sequence. The infrastructure computer 155 can then, for example, analyze the infrastructure sensor 145 data, e.g., using pattern recognition and/or image analysis techniques, to determine the operation data for the sub-region 205. The infrastructure computer 155 can be programmed to transmit the operation data to the server 160, e.g., via the network 135. As another example, the infrastructure computer 155 can provide the infrastructure sensor 145 data to the remote server computer 160, e.g., via the network 135, and the remote server computer 160 can analyze the infrastructure sensor 145 data, e.g., using pattern recognition and/or image analysis techniques, to determine the operation data for the sub-region 205.

Additionally, or alternatively, the remote computer 155, 160 can determine the operation data based on signal phase and timing data (SPaT) for a traffic signal in the sub-region 205. For example, the traffic signal may control traffic moving through the sub-region 205 based on the SPaT data. SPaT data indicates a timing of a change of the traffic signal from a current state to a next state. Changing states in this context means changing priorities for vehicles travelling through the sub-region 205, such as, for example, changing a first light signal for a first direction of travel from green to red (reducing the priority for travel in the first direction), and changing the light signal for a second direction of travel from red to green (increasing the priority for travel in the second direction). Said differently, SPaT data indicates which light signal is currently energized and an amount of time until the light signal will no longer be energized and another light signal will be energized. The infrastructure computer 155 can store the SPaT data for the traffic signal, e.g., in a memory of the infrastructure computer 155. In such an example, the infrastructure computer 155 can provide the SPaT data to the remote server computer 160. As another example, the remote server computer 160 can store the SPaT data for the traffic signal, e.g., in a memory of the remote server computer 160.

Additionally, or alternatively, the remote computer 155, 160 can determine the operation data based on aggregated data. Aggregated data means data from a plurality of vehicle computers 110 that provide messages that is combined arithmetically and/or mathematically, e.g., by averaging and/or using some other statistical measure. That is, the remote computer 155, 160 may be programmed to receive messages from a plurality of vehicle computers 110 indicating operation data for the respective vehicles 105, e.g., determined based on vehicle 105 sensor 115 data. Based on the aggregated data indicating the operation data for the vehicles 105 in the sub-region 205 (e.g., an average number of messages, a percentage of messages, etc., indicating the operation data), and taking advantage of the fact that messages from different vehicles 105 are provided independently of one another, the remote computer 155, 160 can determine the operation data for the sub-region 205 based on the vehicle 105 data.

The vehicle computer 110 may be programmed to, upon receiving the respective messages via the network 135, generate respective second timestamps $t_v$. That is, the vehicle computer 110 can store (e.g., in a memory thereof) respective current times at which the respective messages were received from the remote computer 155, 160. The vehicle computer 110 can then transmit the respective second timestamps $t_v$ to the remote computer 155, 160 via the network 135. The vehicle computer 110 can transmit, via the network 135, the respective second timestamps $t_v$ in one or more response messages. As one example, the vehicle computer 110 can transmit one response message that includes the respective second timestamps $t_v$. As another example, the vehicle computer 110 can transmit respective response messages that each include one respective second timestamps $t_v$.

The vehicle computer 110 may be programmed to operate the vehicle 105 based on the data message. For example, the vehicle computer 110 can access the data message to determine the operation data for the sub-region 205. The vehicle computer 110 can then generate a path along which to operate the vehicle 105 through the sub-region 205 that accounts for the operation data for the sub-region 205 (e.g., to maintain a specified distance between the vehicle 105 and objects in the sub-region 205, to adjust a speed of the vehicle 105 based on SPaT, to maintain a speed of the vehicle 105 at or below a specified speed for the sub-region 205, etc.). The vehicle computer 110 can actuate one or more vehicle components 125 to move the vehicle 105 along the path.

A path can be specified according to one or more path polynomials. A path polynomial is a polynomial function of degree three or less that describes the motion of a vehicle on a ground surface. Motion of a vehicle on a roadway is described by a multi-dimensional state vector that can include vehicle location, heading angle, yaw, speed, etc. that can be determined by fitting a polynomial function to successive 2D locations included in the vehicle motion vector with respect to the ground surface, for example.

Further for example, the path polynomial is a model that predicts the path as a line traced by a polynomial equation. The path polynomial predicts the path for a predetermined upcoming distance, by determining a lateral coordinate, e.g., measured in meters:

$$p(x)=a_0+a_1x+a_2x^2+a_3x^3 \quad (7)$$

where $a_0$ an offset, i.e., a lateral distance between the path and a center line of the vehicle 105 at the upcoming distance x, $a_1$ is a heading angle of the path, $a_2$ is the curvature of the path, and $a_3$ is the curvature rate of the path.

Figure 4:
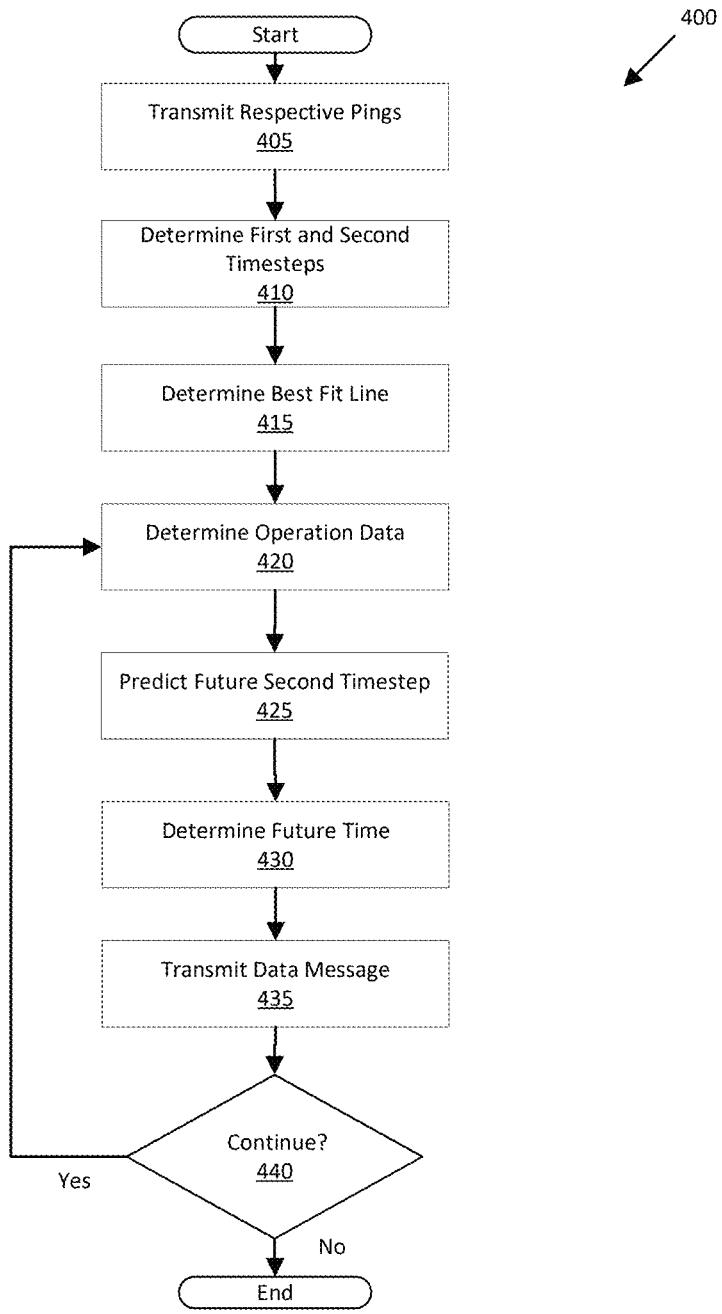
FIG. 4 is an example flowchart of an example process for determining a transmission time to provide a data message.

FIG. 4 is a diagram of an example process 400 for determining a transmission time at which to provide a data message. The process 400 begins in a block 405. The process 400 can be carried out by a remote computer 155, 160 executing program instructions stored in a memory thereof. The remote computer 155, 160 may be a server computer 160, or may be included in an infrastructure element 140 arranged to monitor an sub-region 205, as discussed above.

In the block 405, the computer 155, 160 transmits respective messages to one or more vehicle computers 110 via the network 135. Additionally, the remote computer 155, 160 generates respective first timestamps $t_c$ for the respective messages, as discussed above. The process 400 continues in a block 410.

In the block 410, the remote computer 155, 160 determines respective first timesteps $\Delta t_c$ and respective second timesteps $\Delta t_v$. As discussed above, the remote computer 155, 160 determines the respective first timesteps $\Delta t_c$ based on respective differences between sequential first timestamps $t_c$. The remote computer 155, 160 determines respective second timesteps $\Delta t_v$ based on respective differences between sequential second timestamps $t_v$, as discussed above. The remote computer 155, 160 receives the second timestamps $t_v$ from the vehicle computer(s) 110 via the network 135, as discussed above. The process 400 continues in a block 415.

In the block 415, the remote computer 155, 160 determines a best fit line L based on the respective first timesteps $\Delta t_c$ and the respective second timesteps $\Delta t_v$. The computer 155, 160 determines a set of points 300 by dividing the respective first timesteps $\Delta t_c$ by the respective second timesteps $\Delta t_v$, as discussed above. The remote computer 155, 160 then determines the best fit line L based on the set of points 300 using known calculation methods, as discussed above. The process 400 continues in a block 420.

In the block 420, the remote computer 155, 160 determines operation data for an sub-region 205. The remote computer 155, 160 can determine the operation data based on sensor data, based on signal phase and timing data (SPaT) for a traffic signal, and/or aggregated data, as discussed above. The remote computer 155, 160 can, for example, generate a data message that includes the operation data for the sub-region 205, as discussed above. The process 400 continues in a block 425.

In the block 425, the remote computer 155, 160 predicts a future second timestep $\Delta t_{vf}$. For example, the remote computer 155, 160 can predict the future second timestep $\Delta t_{vf}$ based on an amount of data included in the data message and an expected data transfer rate, as discussed above. The process 400 continues in a block 430.

In the block 430, the remote computer 155, 160 estimates a transmission time based on the best fit line L and the future second timestep $\Delta t_{vf}$. For example, the remote computer 155, 160 can determine a future first timestep $\Delta t_{cf}$ by solving Equation 1 using the future second timestep $\Delta t_{vf}$, as discussed above. The remote computer 155, 160 then determines the transmission time by adding the future first timestep $\Delta t_{cf}$ to a previous transmission time at which a previous data message was provided, as discussed above. The process 400 continues in a block 435.

In the block 435, the remote computer 155, 160 transmits, via the network 135, the data message to the vehicle computer 110 at the transmission time. The process 400 continues in a block 440.

In the block 440, the remote computer 155, 160 determines whether to continue the process 400. For example, the remote computer 155, 160 can determine not to continue when no vehicles 105 are present within the sub-region 205. Conversely, the remote computer 155, 160 can determine to continue while vehicles 105 are present within the sub-region 205. If the remote computer 155, 160 determines to continue, the process 400 returns to the block 420. Alternatively, the process 400 can return to the block 405 (e.g., upon expiration of a timer with a specified duration (e.g., stored in a memory of the remote computer 155, 160) so that the best fit line L can be updated over time). Otherwise, the process 400 ends.

Figure 5:
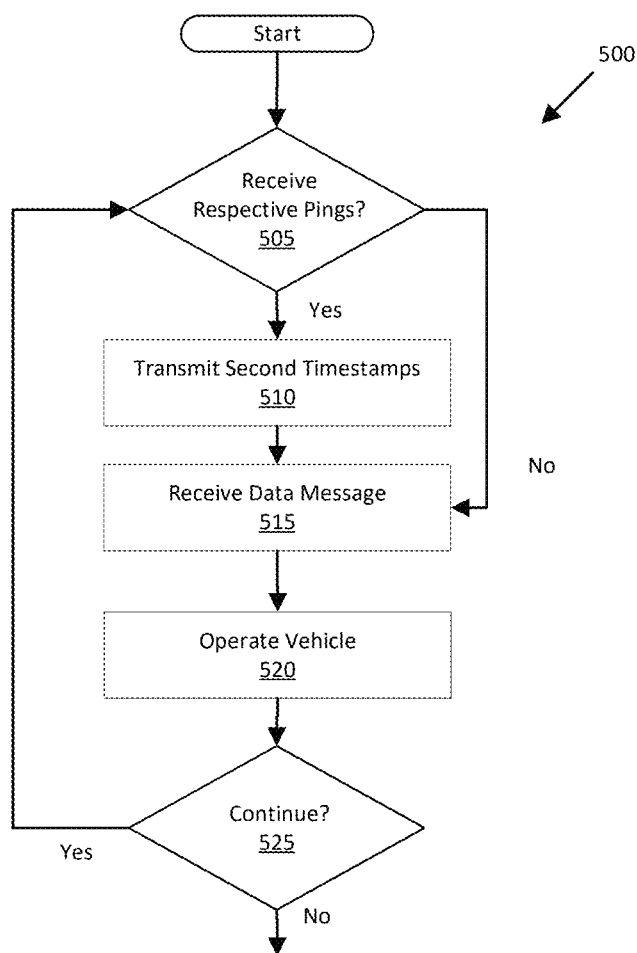
FIG. 5 is an example flowchart of an example process for operating a vehicle.

FIG. 5 is a diagram of an example process 500 for operating a vehicle 105. The process 500 begins in a block 505. The process 500 can be carried out by a vehicle computer 110 included in the vehicle 105 executing program instructions stored in a memory thereof.

In the block 505, the vehicle computer 110 determines whether respective messages have been received via the network 135. If the vehicle computer 110 receives the respective messages, then the process 500 continues in a block 510. Otherwise, the process 500 continues in a block 515.

In the block 510, the vehicle computer 110 transmits respective second timestamps $t_v$ to the remote computer 155, 160 via the network 135. The vehicle computer 110 generates respective second timestamps $t_v$ upon receiving the respective messages, as discussed above. The vehicle computer 110 can then generate and transmit, via the network 135, a response message that includes the respective second timestamps $t_v$, as discussed above. The process 500 continues in a block 515.

In the block 515, the vehicle computer 110 receives the data message via the network 135. The vehicle computer 110 then accesses the data message to determine operation data for the sub-region 205, as discussed above. The process 500 continues in a block 520.

In the block 520, the vehicle computer 110 operates the vehicle 105 based on the operation data for the sub-region 205. For example, the vehicle computer 110 can generate a path based on the operation data and can actuate vehicle components 125 to move the vehicle 105 along the path, as discussed above. The process 500 continues in a block 525.

In the block 525, the vehicle computer 110 determines whether to continue the process 500. For example, the vehicle computer 110 can determine not to continue when the vehicle 105 is in an OFF state or outside of the sub-region 205. Conversely, the vehicle computer 110 can determine to continue while the vehicle 105 is in an ON state and inside of the sub-region 205. If the vehicle computer 110 determines to continue, the process 500 returns to the block 505. Otherwise, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions (e.g., from a memory, a computer readable medium, etc.) and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a first computer including a processor and a memory, the memory storing instructions executable by the processor to:
   upon transmitting respective messages to a second computer communicatively coupled to the first computer via a network, generate respective first timestamps;
   upon receiving, from the second computer, respective second timestamps at which the second computer received the respective messages via the network, determine a best fit line based on respective first timesteps between the respective first timestamps and respective second timesteps between the respective second timestamps;
   determine a transmission time based on the best fit line and a future second timestep; and
   transmit a data message to the second computer via the network at the transmission time.

2. The system of claim 1, wherein the instructions further include instructions to estimate the future second timestep based on an amount of data included in the data message and an expected data transfer rate of the network.

3. The system of claim 1, wherein the best fit line represents a set of points determined by dividing the respective first timesteps by the respective second timesteps.

4. The system of claim 1, wherein the instructions further include instructions to determine a future first timestep based on the best fit line and the future second timestep.

5. The system of claim 4, wherein the instructions further include instructions to determine the transmission time based on the future first timestep and a previous transmission time.

6. The system of claim 5, wherein a previous data message is provided to the second computer at the previous transmission time.

7. The system of claim 1, wherein the first computer is included in an infrastructure element and the second computer is included in an object remote from the infrastructure element.

8. The system of claim 1, wherein the first computer is a server and the second computer is included in an object.

9. The system of claim 1, further comprising the second computer, including a second processor and a second memory storing instructions executable by the second processor such that the second computer is programmed to operate an object based on the data message.

10. The system of claim 1, further comprising the second computer, including a second processor and a second memory storing instructions executable by the second processor such that the second computer is programmed to:
    upon receiving the respective messages, generate the respective second timestamps; and
    transmit, via the network, the respective second timestamps to the first computer.

11. A method, comprising:
    upon transmitting, via a network, respective messages to a second computer, generating, via a first computer, respective first timestamps;
    upon receiving, from the second computer, respective second timestamps at which the second computer received the respective messages, determining, via the first computer, a best fit line based on respective first timesteps between the respective first timestamps and respective second timesteps between the respective second timestamps;
    determining a transmission time based on the best fit line and a future second timestep; and
    transmitting a data message to the second computer at the transmission time.

12. The method of claim 11, further comprising estimating, via the first computer, the future second difference based on an amount of data included in the data message and an expected data transfer rate of a network.

13. The method of claim 11, wherein the best fit line represents a set of points determined by dividing the respective first timesteps by the respective second timesteps.

14. The method of claim 11, further comprising determining, via the first computer, a future first timestep based on the best fit line and the future second timestep.

15. The method of claim 14, further comprising determining, via the first computer, the transmission time based on the future first timestep and a previous transmission time.

16. The method of claim 15, wherein a previous data message is provided to the second computer at the previous transmission time.

17. The method of claim 11, wherein the first computer is included in an infrastructure element and the second computer is included in an object remote from the infrastructure element.

18. The method of claim 11, wherein the first computer is a server and the second computer is included in an object.

19. The method of claim 11, further comprising operating, via the second computer, an object based on the data message.

20. The method of claim 11, further comprising:
- upon receiving the respective messages, generating, via the second computer, the respective second timestamps; and
- transmitting, via the network, the respective second timestamps to the first computer.

\* \* \* \* \*